(No Model.) 5 Sheets—Sheet 1.
O. E. O. HOELL & A. SYVERSEN.
O. C. LAND & H. THOMPSON, Executors of A. SYVERSEN, Deceased.
STOVEPIPE ELBOW MACHINE.
No. 519,062. Patented May 1, 1894.
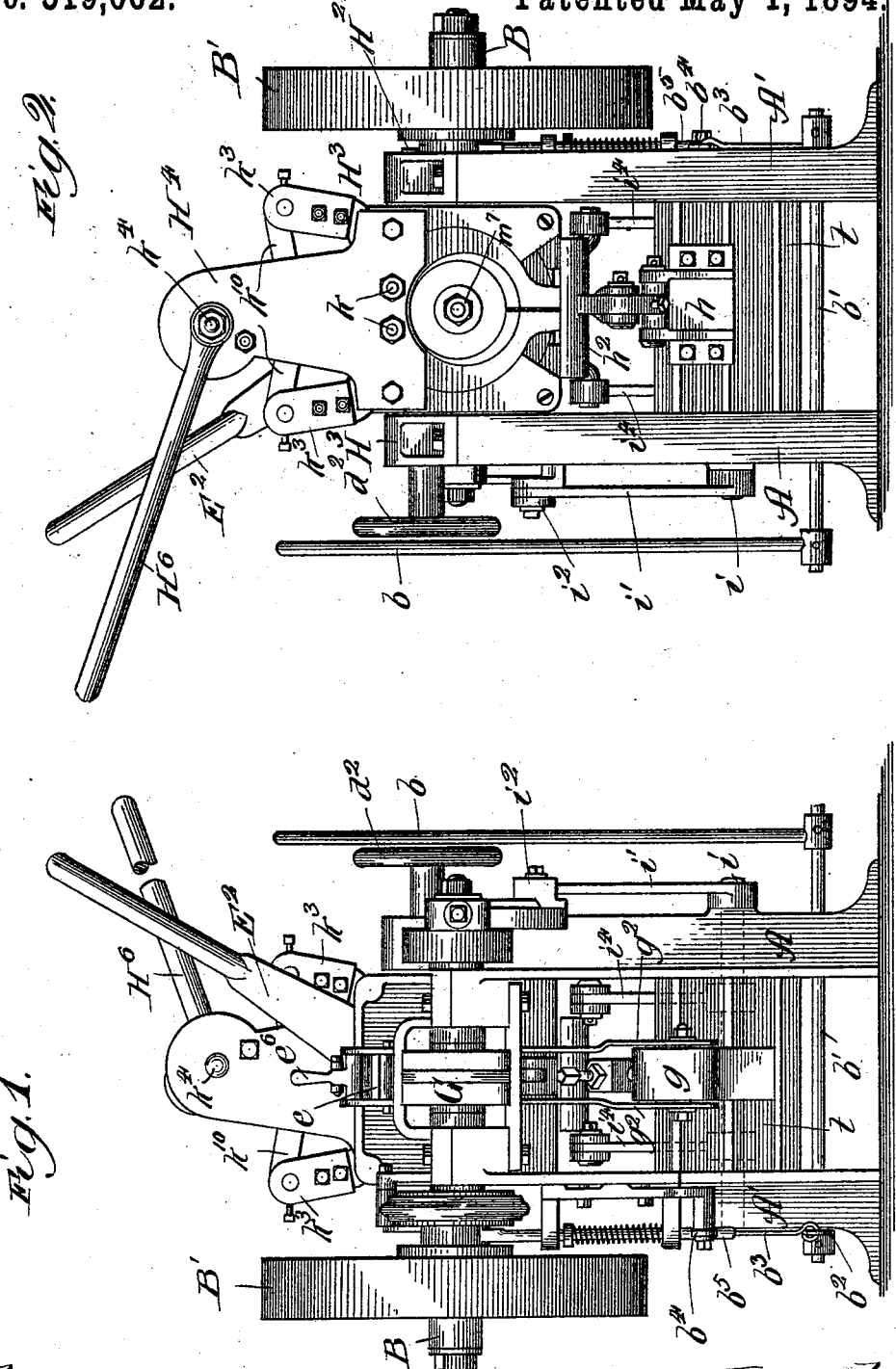

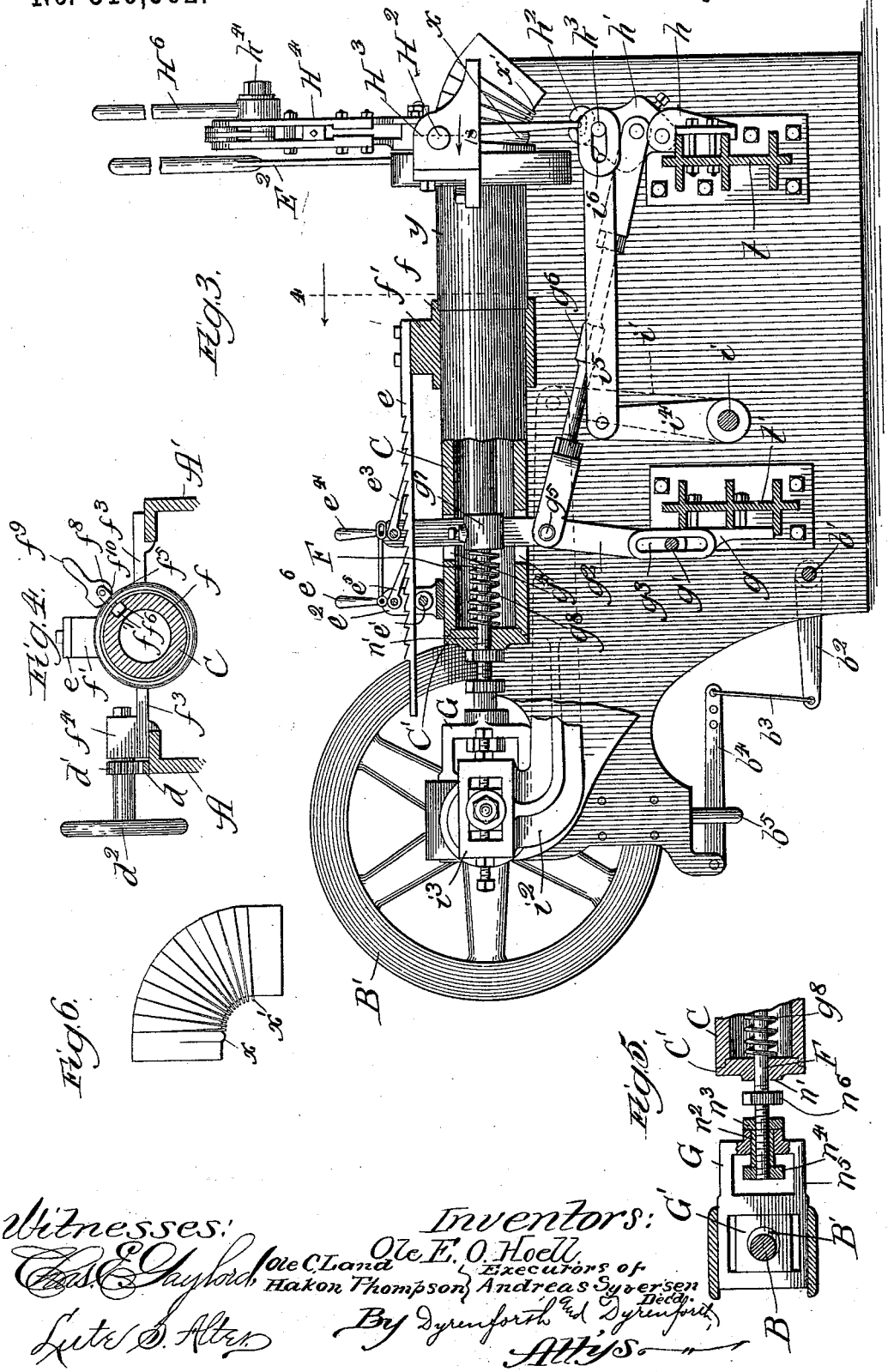

(No Model.) 5 Sheets—Sheet 3.
O. E. O. HOELL & A. SYVERSEN.
O. C. Land & H. Thompson, Executors of A. Syversen, Deceased.
STOVEPIPE ELBOW MACHINE.
No. 519,062. Patented May 1, 1894.
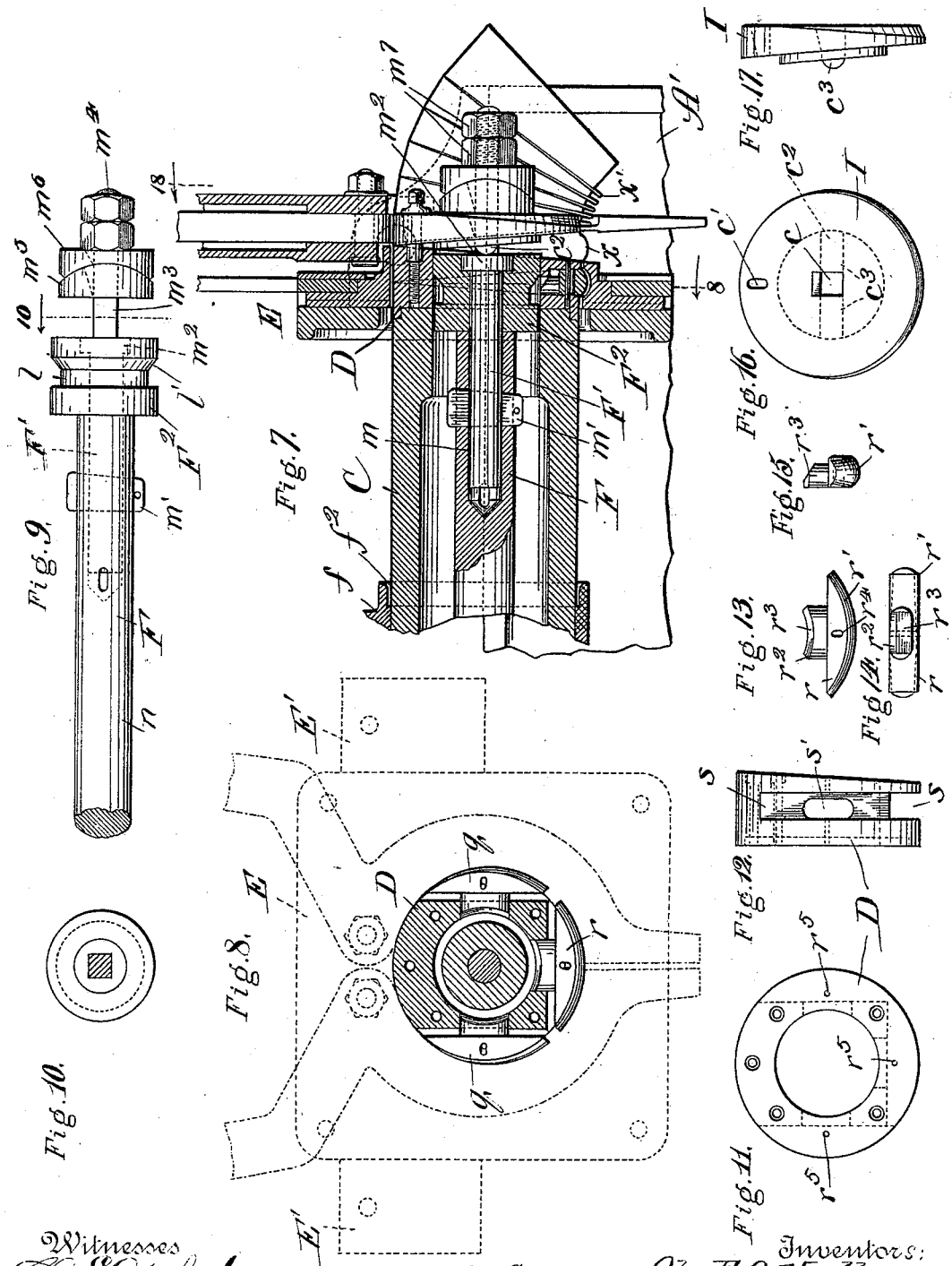

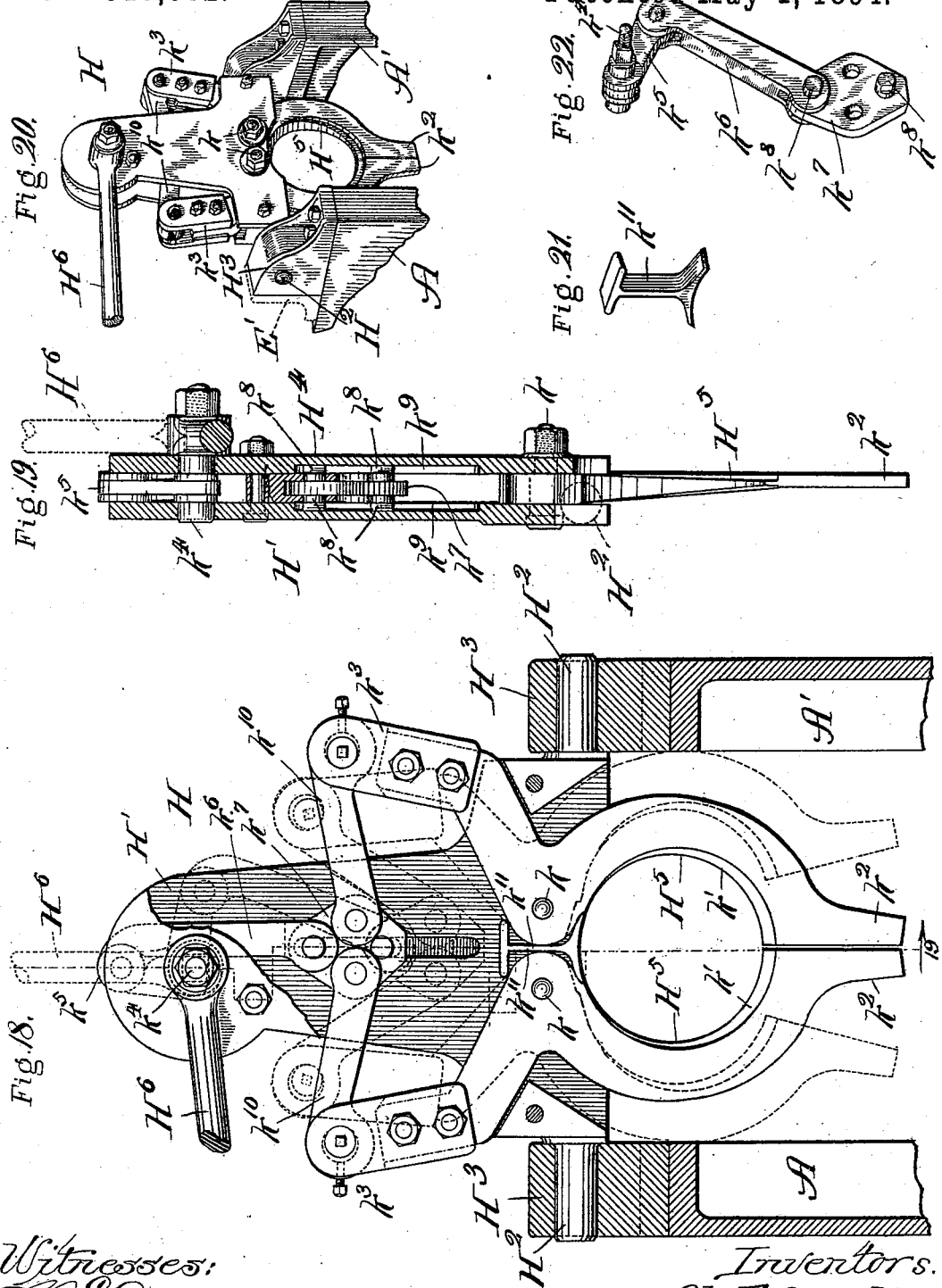

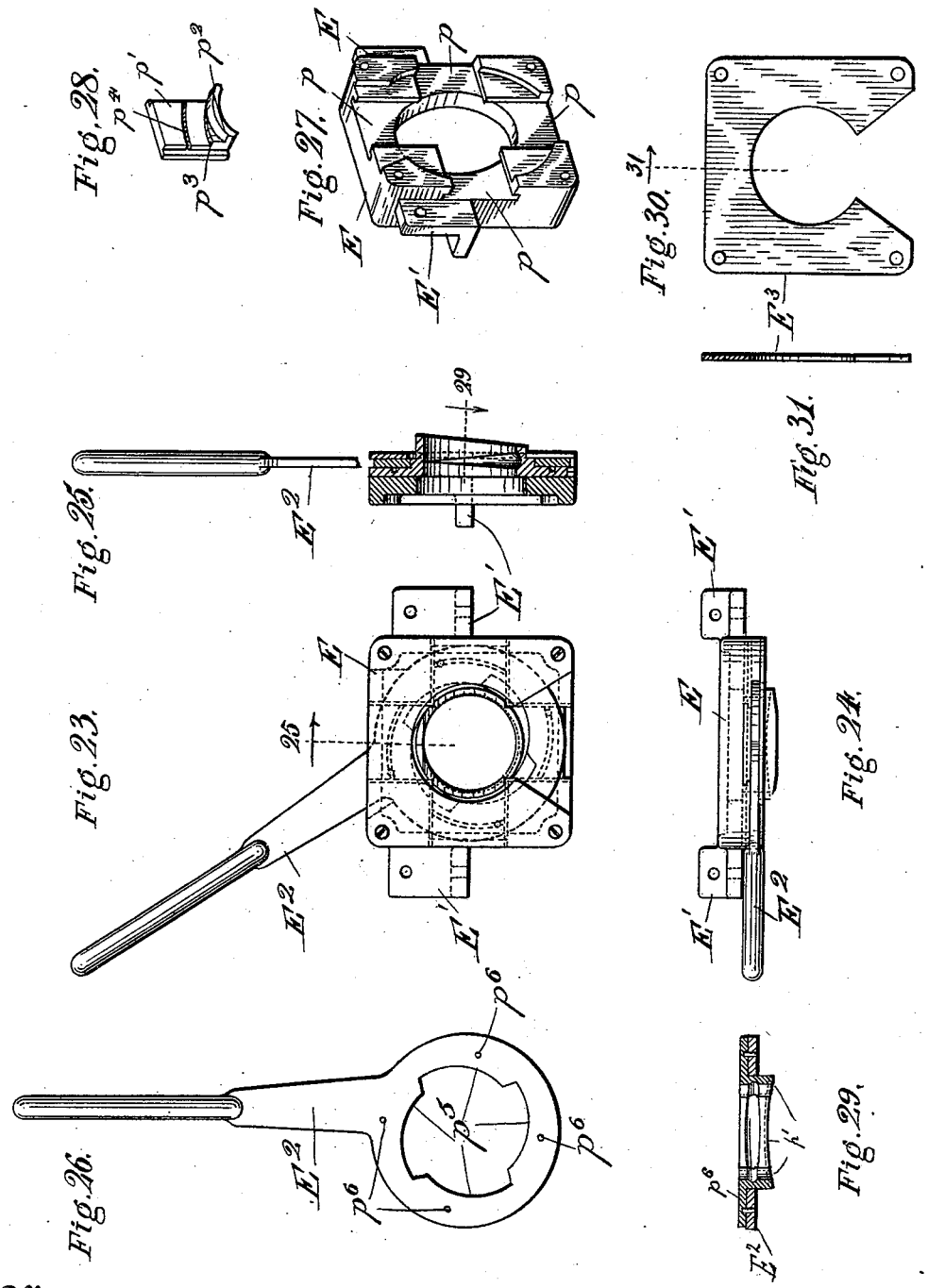

UNITED STATES PATENT OFFICE.

OLE E. O. HOELL, AND OLE C. LAND AND HAKON THOMPSON, OF CHICAGO, ILLINOIS, EXECUTORS OF ANDREAS SYVERSEN, DECEASED, ASSIGNORS TO THE CHICAGO CORRUGATED ELBOW COMPANY, OF SAME PLACE.

STOVEPIPE-ELBOW MACHINE.

SPECIFICATION forming part of Letters Patent No. 519,062, dated May 1, 1894.

Application filed January 10, 1894. Serial No. 496,348. (No model.)

*To all whom it may concern:*

Be it known that OLE E. O. HOELL, a citizen of the United States, residing at Chicago, in the county of Cook and State of Illinois, and ANDREAS SYVERSEN, deceased, formerly a citizen of the United States, who resided at Chicago, county of Cook, and State of Illinois, (whose duly-appointed executors, OLE C. LAND and HAKON THOMPSON, of Chicago, county of Cook, and State of Illinois, join in this application,) invented a new and useful Improvement in Stovepipe-Elbow Machines, of which the following is a specification.

This invention relates to improvements in machines for forming crimped or corrugated stove-pipe elbows of the character in which the surplus sheet metal is crimped outward and compressed into folds to produce the proper curve of the elbow; and the object is to provide a machine of generally improved construction, whereby the elbows may be formed from a straight blank speedily, accurately and with little labor or necessary skill on the part of the operator.

In the drawings—Figure 1 is a rear end elevation of the machine, or end at which the power is applied; Fig. 2, a front end elevation of the machine; Fig. 3, a view of the machine partly in side elevation, partly in section, with portions broken away to disclose features which would otherwise be hidden, and with other parts indicated by dotted lines; Fig. 4, a broken section on line 4 of Fig. 3, viewed in the direction of the arrow; Fig. 5, a vertical section showing a plunger bar and means for reciprocating the same; Fig. 6, a view in elevation of a finished elbow; Fig. 7, a longitudinal section enlarged showing the forward end of a mandrel and attendant parts; Fig. 8, a section taken on line 8 of Fig. 7, showing an inner chuck provided with expansible groove or crimp forming dies, parts in advance of the said section being indicated by dotted lines; Fig. 9, a broken view in elevation of the plunger bar; Fig. 10, a section taken on line 10 of Fig. 9; Fig. 11, a face or front view of the inner chuck shown in Fig. 8; Fig. 12, a side elevation of the inner chuck with the expanding dies or formers removed; Figs. 13, 14 and 15, respectively, side, top and end views of one of the expansible groove formers or dies removed from the chuck; Fig. 16, a front view of a swinging mandrel plate; Fig. 17, a side view of the same; Fig. 18, a broken enlarged section taken on line 18 of Fig. 7 showing crimp folding mechanism in one position by full lines, and in another position by dotted lines; Fig. 19, a section taken on line 19 of Fig. 18; Fig. 20, a broken perspective view of the crimp folding mechanism; Figs. 21 and 22 perspective views of details of the crimp folding mechanism; Fig. 23, a detail view of a chuck surrounding the chuck shown in Fig. 12, and holding outer, contractible dies which co-operate with the inner expansible dies to form a crimp; Fig. 24, a top plan view of the chuck shown in Fig. 23; Fig. 25, a section taken on line 25 of Fig. 23; Fig. 26, a detail view of an operating cam lever for the dies in the outer chuck; Fig. 27, a perspective view of the outer chuck; Fig. 28, a perspective view of one of the dies held by the outer chuck; Fig. 29, a section of the dies and cam lever, taken on line 29 of Fig. 25; Fig. 30 the face plate of the outer chuck; and Fig. 31, a section taken on line 31 of Fig. 30.

The main frame of the machine comprises two cheeks or side frames A A′ tied together toward the front and rear by cross braces $t\, t'$.

Journaled upon the rear upper end of the machine is a drive shaft B carrying a power pulley B′. Extending longitudinally and centrally between the cheeks is a hollow cylindrical mandrel C held rigidly in place. Secured to the forward end of the mandrel is an annular die-holder or chuck D, which at its outer circumferential face registers with the corresponding face of the mandrel. The chuck D is provided at its lateral and lower sides with recesses $s$, the bases of the lateral recesses being parallel with each other and at a right-angle to the lower recess. At the base and center of each recess $s$ is an opening $s'$ through the chuck. Fitting into the lower recess $s$ is a segmental die or former $r$ having a head $r'$ and a shank $r^2$. The circumferential edge of the head $r'$ is convex in cross section affording a die surface, widest at the center of the head and tapering or diminishing to the opposite ends, as indicated by dotted lines in Fig. 14. The shank $r^2$ fits and extends through the respective opening $s'$ and projects normally beyond the inner circumferential face of the chuck. The inner end of the shank $r^2$ is concave in the arc of a circle concentric with the inner circumference of the chuck, and provided at one side with a beveled face $r^3$, all as plainly shown in Figs. 13, 14 and 15. In the lateral recesses or sockets $s$ are dies $q$ formed like the die $r$ except that the outer edges or working faces of their heads are formed with convex surfaces, which at the ends adjacent to the dies $r$ are of the same size as the convex surface on the head $r'$ and taper gradually until they disappear at the opposite ends of the parts $q$. In one face of each of the dies $r$ $q$ is an elongated radially-extending socket $r^4$ through which extends a pin $r^5$ passing through the chuck. The engagement of the sockets $r^4$ with the pins $r^5$ permit the dies to move radially in the chuck a distance corresponding with the lengths of the slots $r^4$, and hold the dies in the chuck against displacement.

Surrounding the chuck D is a die-holder or chuck E provided with laterally-extending ears $E'$ $E'$, at which it is bolted upon the upper edges of the cheeks A A'. The chuck E has a central opening, the face of which is close to and out of contact with the outer surface of the chuck D. The chuck E is formed as shown most clearly in Fig. 27, having a face-plate $E^3$, and provided with four radial T-socket guide-grooves $p$.

Mounted in each guide-groove $p$, to slide readily therein, is a die-member $p'$ at its inner face describing an arc of the same circle as that of the inner surface of the chuck E. At its inner end each die-member $p'$ is provided with a flange $p^2$ and a cam shoulder $p^3$. Above the cam shoulder is a cam groove $p^4$. Surrounding the dies at the cam-shoulders $p^3$ is a ring provided with a handle forming a cam lever $E^2$. The inner circumference of the ring is provided with cam faces $p^5$ fitting upon the cam-shoulder $p^3$; and projecting from the rear face of the ring are four pins $p^6$ which extend into and engage the cam-grooves $p^4$. The lowest die-member $p'$ is provided in its upper edge or working face with a recess affording a concave die surface adapted to fit over and conform to the convex die surface of the die member $r$ in the chuck D; and the lateral die members $p'$ are provided in their working faces with tapering recesses affording concave die surfaces conforming to and fitting over the working faces of the die members $q$ in the chuck D. The die members $p'$ are caused to slide radially in the inward direction by moving the cam lever $E^2$ to the left, from the position shown in Fig. 26, to that shown in Fig. 23, whereby the cam surfaces $p^5$ engage the cam shoulders $p^3$; and in the return of the lever the die members are drawn radially outward by the engagement of the pins $p^6$ with the cam-grooves $p^4$.

F is a longitudinally movable plunger bar having an enlarged portion $n$ and a reduced portion $n'$. The bar F at its reduced portion extends through a central opening in a cap $C'$ at the rear end of the mandrel C, and from the said opening it extends in the hollow mandrel in practice, slightly below the center of the latter. On the rear end of the reduced portion $n'$ of the bar F is a short sleeve $n^2$ firmly secured to the bar and provided at opposite ends with stop nuts $n^3$ $n^4$. G is a cross head provided at its forward end with a yoke $n^5$ which fits around the sleeve $n^2$ between the stops $n^3$ $n^4$. The cross head block $G'$ surrounds an eccentric $B'$ on the shaft B, whereby in the rotation of the shaft the cross head is reciprocated. Between the stop nut $n^3$ and cap $n'$ is a stop nut $n^6$. In the forward end of the enlarged part $n$ of the bar F is a socket $m$. Rigidly secured in the socket by means of a cotter $m'$ is a bar $F'$ having a flange or collar $m^2$, a squared portion $m^3$ and a threaded end $m^4$. On the bar $F'$ is an annular head or sleeve $F^2$ provided in its outer face with an annular socket into which the flange or collar $m^2$ extends, the flange operating to clamp the head $F^2$ against the forward end of the bar F. The head $F^2$ at its circumferential face fits and slides against the inner circumferential surface of the mandrel; and the head is provided with a circumferential recess $l$ affording an annular wedge $l'$. The groove $l$ registers normally with the clutch D, the shanks of the die members in the latter extending into the groove with their beveled faces in the direction of the wedge surface $l'$. In the movement of the plunger bar in the backward direction, as hereinafter described, the annular expander or wedge surface $l'$ engages the beveled faces $r^3$ of the die members $r$, $q$ and forces the latter radially outward.

The crimp folding mechanism H has a back plate $H'$ provided with laterally extending trunnions $H^2$ journaled in bearings $H^3$, which are secured upon the upper edges of the cheeks A A'. Secured against the plate $H'$ is a front plate $H^4$ of the same form in outline as the plate $H'$. Fulcrumed upon pins $k$ $k$ on the back plate $H'$ are crimp folding jaws or levers $H^5$ $H^5$, the lower arms $k'$ of which describe each nearly a semi-circle and terminate in parallel ends $k^2$. When closed together, as shown by full lines in Fig. 18, the arms $k'$ at their inner sides form a nearly complete circle in substantially the same arc as the outer circumference of the mandrel. Rigidly secured to the upper ends of the levers $H^5$ are bearing plates $k^3$. Extending through and journaled in the front and back plate $H^4$ $H'$ is a shaft $k^4$ provided between the plates with a crank arm $k^5$. A link $k^6$ is pivotally connected at its upper end to the free end of the crank arm $k^5$, and at its lower end is pivotally connected to a sliding plate $k^7$. The plate $k^7$ is provided on its front and rear sides with lugs $k^8$, which slide in vertical coincident grooves $k^9$ in the front and back plates; and links $k^{10}$ are pivotally connected at their opposite ends respectively to the sliding plate $k^7$ and bearing plates $k^3$. On the shaft $k^4$ is a crank or operating handle $H^6$. The crimp folding mechanism rocks upon the trunnions $H^2$ to swing the jaws or levers $H^5$ forward and backward, as hereinafter described. Between the levers $H^5$ at their fulcrums $k$ is a T-shaped shoe $k^{11}$ which is held between the levers. The lower part or flange of the shoe is concave in the arc of the circle described by the jaws $k'$, and the levers near their fulcrums engage the flange of the shoe at opposite sides to press the shoe downward as the jaws are close together and raise the shoe as the jaws are separated. The jaws when opened, as indicated by dotted lines in Fig. 18, may be closed, as indicated by full lines in that figure, by swinging the handle $H^6$ from the position indicated by dotted lines to that illustrated by full lines. Turning of the lever, as stated, swings the crank $k^5$ and link $k^6$ in the upward direction, sliding the plate $k^7$ upward in its guides and forcing the links $k^{10}$ in the outward direction, whereby the jaws or levers are forced outward at their upper ends and inward at the lower ends. Fulcrumed at opposite ends in the cheeks A A' is a rock shaft $i$ provided at one end, which projects beyond the cheek A, with a crank arm $i'$. Pivotally connected at one end to the upper end of the crank arm $i'$ is a pitman $i^2$, which at its rear end terminates in a cross head $i^3$. The cross head fits over an eccentric on the end of the shaft B, the eccentric being substantially like the eccentric B' shown in Fig. 5. At the center of the cross brace $t$ is a bracket $h$. Pivotally mounted at its lower end in the bracket $h$ is a swinging lever $h'$ having a T-head $h^2$ recessed in its upper face in the direction crosswise of the machine to receive the lower ends $k^2$ of the jaws or levers $H^5$. On the rock shaft $i$ between the cheeks of the machine are two upward extending crank arms $i^4$, and $i^5$ are links pivotally connected at their rear ends to the upper ends of the crank arms $i^4$, and provided at their forward ends with longitudinal sockets $i^6$ engaging laterally-projecting lugs $h^3$ on the lever $h'$. On the cross brace $t'$ is a bracket $g$ provided at its upper end with laterally-extending bearing pins $g'$; and $g^2 g^2$ are levers provided at their lower ends with elongated slots $g^3$ engaging the pins $g'$, the levers extending upward through elongated openings $g^4$ through the mandrel C at opposite sides of the plunger bar F. Extending between the levers $g^2$ below the mandrel is a pin $g^5$, and pivotally connected at its rear end with the pin $g^5$, and at its forward end with the levers $h'$ below the head $h^2$, is a link $g^6$. Surrounding the mandrel C is a sliding collar $f$ provided at its upper side with a lug $f'$. At its forward side the collar is enlarged slightly around the mandrel to afford an annular recess $f^2$. Secured to and extending backward from the lug $f'$ on the collar is a ratch $e$, which is supported toward its rear end by an anti-friction wheel $e'$ on a standard $e^2$ mounted upon the mandrel. Mounted between the upper ends of the levers $g^2$ is a pawl $e^3$ engaging the ratch and provided with a handle $e^4$, and on the standard $e^2$ is a pawl $e^5$, also engaging the ratch and provided with a handle $e^6$. On the reduced portion of the plunger bar F and secured thereto is a collar $g^7$, which is secured to or forms an integral part of the levers $g^2$. Confined between the collar $g^7$ and the cap C' of the mandrel is a spring $g^8$. On the collar $f$ are lateral bearing plates $f^3$ which rest and slide upon the upper edges of the cheeks A A'. On the upper edge of the cheek A is a rack $d$; and journaled in a bearing $f^4$ on the adjacent plate $f^3$ is a shaft carrying a pinion $d'$, engaging the rack $d$, and a crank wheel $d^2$. The forward faces of the chucks D and E, as will be seen by reference to Figs. 7 and 12, extend at an acute angle to the vertical plane. I is a swinging mandrel plate provided with a central opening $c$, squared and beveled as shown, to fit and swing over the squared portion $m^3$ of the bar F'. Near its upper edge the plate is provided with an opening $c'$ elongated and rendered flaring in the vertical direction which fits over the shank of a bolt $c^2$ which holds the mandrel plate to the chuck D. On the rear face of the plate I at opposite sides of the opening $c$ are convex bearing projections $c^3$, which bear against the flange $m^2$ of the bar F'. Beyond the bearing plate on the squared portion $m^3$ of the bar F' is a collar $m^5$ having a convex outer face fitting in the concave face of a collar $m^6$. The collar $m^5$ has a flaring opening at which it fits over the bar F' and the collars are held against the mandrel plate to confine the latter against the end of the bar F' by nuts $m^7$ on the end of the bar F'. The collar $m^5$ and mandrel plate are adapted to rock on the squared portion $m^3$ of the bar F' in the reciprocation of the plunger bar, the convex face of the collar $m^5$ sliding upon the concave face of the collar $m^6$. The drive pulley B' is normally loose upon the drive shaft B, and when it is desired to operate the machine the drive pulley is caused to engage the shaft by means of clutch mechanism, of a common construction, which causes the drive pulley to rotate the shaft one complete revolution and then release it. The machine is started by turning an operating handle $b$, which is mounted upon a rock shaft $b'$, journaled in the cheeks A A' at the rear lower side of the machine. At its end opposite the handle $b$ the shaft $b'$ carries a crank $b^2$ which connects by means of links $b^3 b^4$ with clutch-engaging mechanism through the medium of a rod $b^5$. When the handle is turned to start the machine it rocks the shaft $b'$ and through the crank arm $b^2$ and links $b^3 b^4$ draws downward the bar $b^5$ and causes the latter to produce engagement between clutch members on the shaft B and pulley B'. When one complete revolution is made by the shaft the clutch members are automatically released. As this mechanism may be of any common construction it is not thought necessary to give more detailed views or description thereof.

In operation to form an elbow, the lever $H^6$ is turned to the position indicated by dotted lines in Fig. 18 to open the jaws $H^5$ and raise the shoe $k^{11}$; the lever $E^2$ is swung to the position of retracting the clutch members in the chuck E; the plunger bar, links and levers are in the position shown in Fig. 3; and the crimp folding levers and mandrel plate in the forward position shown in Fig. 7. The blank Y, from which the elbow is formed, comprises the usual sheet-metal cylinder. The blank is passed at one end between the open jaws $H^5$ and mandrel plate, thence between the inner and outer chucks and over the mandrel to the collar $f$, the inner end of the blank being caused to extend in the recess $f^2$ which holds the overlapping edges of the blank together. In the collar $f$ is an opening $f^5$. Registering with the opening $f^5$ is a groove $f^6$ in the mandrel, extending longitudinally of the latter, in which is a loose clamping piece $f^7$ having a lug $f^8$ which extends through the opening $f^5$. Pivoted upon the outer end of the lug $f^8$ is a lever $f^9$ having an eccentric bearing face $f^{10}$. When the blank is inserted into the recess $f^2$ it passes between the clamping piece $f^7$ and inner circumference of the collar $f$. Turning of the lever $f^9$ causes it to bear at its eccentric surface against the collar and draw the lug $f^8$ and clamping piece upward, to clamp the inner end of the blank at its upper side firmly against the collar or blank feeder $f$. When the blank has been placed in the machine, the lever $E^2$ is swung to press the die members $p'$ inward. The operator then turns the handle $b$ to start the machine, and as before stated, effect one complete revolution of the drive shaft. As shown in Figs. 3 and 5, the stop nuts $n^3$ $n^4$, between which the plunger bar is engaged by the yoke on the cross head G, are farther apart than the thickness of the yoke, the distance between the stop nuts exceeding the thickness of the yoke by a distance equal to the plunge of the cross head. In the first half of the revolution of the drive shaft, (the plunger bar being in the relative position shown in Fig. 3) the cross-head moves in the backward direction, while the yoke is in engagement with the stop nut $n^4$, and causes the plunger bar to be drawn in the backward direction against the resistance of the spring $g^8$ to the position indicated in Fig. 5. In the backward movement of the plunger bar the head $F^2$ is drawn backward, causing the annular wedge surface or expander to engage the die members $r$ $q$ and force them radially outward into the die members $p'$ in the chuck E, thereby stamping a crimp $x$ in the blank Y. In the latter half of the revolution of the drive shaft the cross-head G is moved forward away from the stop nut $n^4$ in the direction of the stop nut $n^3$. The engagement of the die members with the blank holds the latter, the feed collar $f$ and plunger bar in the position at which they are placed by the backward plunge of the cross-head. When the cross-head arrives at the forward limit of its traverse the machine stops. The operator then swings the lever $E^2$ to the position of retracting the die members $p'$, and releasing them from the blank, whereby the spring $g^8$ acts to force the plunger bar forward until the stop nut $n^4$ strikes the yoke $n^5$ and the stop nut $n^6$ strikes the cap $n'$ of the mandrel. The levers $g^2$ are also forced forward by the spring $g^8$, moving the ratch $e$ the distance of one tooth and feeding the blank Y a like distance to carry the crimp $x$ just formed beyond the chucks D E. In the next operation the lever $E^2$ is again turned to force the die members $p'$ inward, and the handle $H^6$ is turned to close the jaws $H^5$ around the blank adjacent to and beyond the crimp $x$, clamping the blank around the mandrel plate I. The machine is started again, as before, and another crimp is produced, as described, in the blank at the chucks D E. While this is taking place in the backward movement of the plunger bar, the mandrel head is swung from the position shown in Fig. 7 against the inclined face of the chuck D, and the pitman $i^2$ is swung first in the backward and then in the forward direction. In the backward movement of the pitman it rocks the crank $i'$, shaft $i$, crank arms $i^4$ and links $i^5$ in the backward direction, swinging the lever $h'$ on its fulcrum, in the bracket $h$, also in the backward direction, causing the jaws $H^5$ to be swung with the mandrel plate I and compress the crimp $x$ into a fold $x'$ against the inclined face of the chuck E. In the last half of the revolution of the shaft B the pitman $i^2$ is moved to its initial position, rocking the shaft $i$ and crank arm $i^4$ forward, and plunging the links $i^5$ in the forward direction. The elongated slots $i^6$, at which the links $i^5$ are connected with the lever $h'$, permit the links to be plunged forward to their initial positions without changing the position of the lever $h'$. The operator then turns the handle $H^6$, to release the jaws $H^5$ from the blank, and then turns the lever $E^2$ to disengage the die members $p'$ from the blank, when the spring $g^8$ will move the parts to the initial position again and feed the blank forward. The inner engaging faces of the jaws $H^5$ are widest at the upper ends and narrow where they meet, to conform to the angles of the spaces between the folded crimps, and they thus operate to shape the crimps equally throughout the blank. The mandrel plate I is beveled off at its forward edge to conform to the jaws $H^5$; and the shoe $k^{11}$, when the jaws $H^5$ are swung, as described, clamp the upper part of the blank against the upper edge of the mandrel plate and prevent wrinkling of the blank at its upper surface while the crimps are being folded. The operation described is repeated until the blank has been formed into the completed elbow shown in Fig. 6. The elbow is then removed, the pawls $e^3$ $e^5$ are swung out of engagement with the ratch $e$ and the feed collar $f$ is returned to its initial position by turning the wheel $d^2$ to cause the collar and attendant parts to travel backward upon the rack $d$. Before placing a blank in the machine the meeting edges at one end are fastened together by a rivet, the end thus fastened being the initial end of the blank, or end which is shown to project from the machine in Fig. 3.

This improved machine is quick and accurate in its action, and a boy may operate it to produce twenty-five dozen or more completed elbows in a day.

While it is preferred to construct the machine in every detail as shown and described, it may be modified in the matter of details of the construction without departing from the spirit of the invention as defined by the claims.

What is claimed as new, and desired to be secured by Letters Patent, is—

1. In a machine for making stove-pipe elbows, the combination with the drive-mechanism of an inner die-holder provided with expanding dies, an outer die-holder provided with contracting dies, a movable expander in the inner die-holder actuated from the drive-mechanism to expand the inner dies, means for contracting the outer dies, a crimp-folding mandrel, outer crimp-folding jaws co-operating with the said mandrel, means for opening and closing the said jaws, and swinging means for the jaws and mandrel actuated from the drive-mechanism, substantially as and for the purpose set forth.

2. In a machine for making stove-pipe elbows, the combination with the drive-mechanism, of an inner die-holder provided with expanding dies, a reciprocal expander in said die holder engaging and expanding the dies in its backward movement and releasing the dies in its forward movement, an outer die-holder provided with contracting dies, contracting means for the outer dies, a swinging crimp-folding mandrel, swinging opening and closing crimp-folding jaws about the mandrel, opening and closing means for the said jaws, a spring operating normally to move the wedge and swing the mandrel and jaws in the forward direction, and means actuated from the drive-mechanism against the resistance of the said spring, to move the expander and swing the mandrel and jaws in the backward direction, substantially as and for the purpose set forth.

3. In a machine for making stove-pipe elbows from a straight cylindrical sheet-metal blank, the combination with the drive-mechanism of a traveling blank feeder, an inner die-holder provided with expanding dies, a reciprocal expander in said die-holder engaging and expanding the dies in its backward movement and releasing the dies in its forward movement, an outer die-holder provided with contracting dies, contracting means for the outer dies, a swinging crimp-folding mandrel, swinging opening and closing crimp-folding jaws about the mandrel, opening and closing means for the jaws, a spring operating normally to move the feeder and expander and to swing the mandrel and jaws in the forward direction, and means actuated from the drive-mechanism, against the resistance of the said spring, to move the expander and swing the mandrel and jaws in the backward direction, substantially as and for the purpose set forth.

4. In a machine for making stove-pipe elbows, the combination of an inner die-holder provided with radially expanding crimp forming dies, expanding means for the dies movable in the said die-holder, an outer die-holder, radially contracting crimp forming dies in the outer die-holder provided with cams, and a lever, provided with cams engaging the cams on the contracting dies, and operating in its movement in one direction, to move the dies radially inward, substantially as and for the purpose set forth.

5. In a machine for making stove-pipe elbows, the combination of an inner die-holder provided with radially expanding crimp-forming dies, expanding means for the dies movable in the said die holder, an outer die-holder, radially contracting crimp-forming dies $p'$, in the outer die-holder, provided with cams $p^3$ and $p^4$, and a lever $E^2$ engaging the dies at the cams $p^3$ and $p^4$ and operating substantially as described.

6. The combination of the inner die-holder D having recesses $s$ and openings $s'$, expanding dies $r$, $q$, in the said recesses, having shanks which extend through the said openings and are provided with beveled ends, a wedge movable in the said die-holder against the beveled ends of the said shanks to expand the dies, an outer die-holder, radially contracting dies $p'$ in the outer die-holder, provided with cams $p^3$, and a lever $E^2$ on the outer die-holder operating, when moved in one direction, to engage the cams $p^3$ and contract the dies $p'$, substantially as described.

7. In a machine for making stove-pipe elbows, the combination with the drive-mechanism, of an inner swinging crimp-folding mandrel, swinging crimp-folding opening and closing jaws about and swinging with the said mandrel, lever-mechanism connected with the jaws for opening and closing them, and means actuated from the drive-mechanism for swinging the said mandrel and jaws, simultaneously substantially as and for the purpose set forth.

8. In a machine for making stove-pipe elbows, the combination with the drive-mechanism of an inner crimp-folding mandrel pivotally supported toward its upper side to swing, a plunger bar actuated from the drive-mechanism and connected with the said mandrel to swing it on its pivot, swinging crimp-folding opening and closing jaws about and swinging with the said mandrel, lever-mechanism connected with the jaws for opening and closing them, and jaw-swinging means actuated from the said drive-mechanism to swing them with the said mandrel, substantially as and for the purpose set forth.

9. In a machine for making stove-pipe elbows, the combination of an inner, swinging, crimp-folding mandrel, and outer crimp-folding mechanism comprising a swinging support, opening and closing jaws pivotally mounted on the support to close about the mandrel, lever-mechanism for opening and closing the jaws, and a shoe $k^{11}$ movable with the jaws, substantially as and for the purpose set forth.

10. In a machine for making stove-pipe elbows, the combination of an inner, swinging, crimp-folding mandrel, and outer crimp-folding mechanism comprising a swinging support, jaws pivotally mounted in the support to extend about the said mandrel, opening and closing means for the jaws, consisting of a sliding plate mounted in guides in the support, pivotal links extending between the said plate and jaws, a rock-shaft on the support provided with an operating handle, a crank on said shaft and a pivotal link extending between said crank and sliding plate, and a shoe on the support actuated by movement of the jaws to bear against the mandrel as the jaws are closed and release the mandrel as the jaws are opened, substantially as and for the purpose set forth.

11. In a machine for making stove-pipe elbows, the combination with the drive-shaft, of the swinging opening and closing crimp-folding jaws $H^2$, having projecting ends $k^2$, a pivotal swinging lever $h'$ engaging the ends $k^2$, a spring operating normally to move the said lever and swing the jaws in the forward direction, and means actuated from the said drive shaft, counter to the spring, for swinging the lever $h'$ and jaws in the backward direction, substantially as and for the purpose set forth.

12. In a machine for making stove-pipe elbows, the combination with the main frame and drive-shaft, of a stationary hollow mandrel, a reciprocable-bar in the mandrel connected with and operated by the drive-shaft to be moved thereby in the backward direction and then released with each revolution of the shaft, a spring operating normally to move the bar in the forward direction, when released by the drive-shaft, a traveling elbow-blank-feeder on the mandrel, a ratch on the said feeder, a pawl supported to move with the bar to engage and advance the feeder in the forward movement of the bar, and means for returning the feeder to its initial position comprising a rack upon the main frame and a shaft journaled upon the feeder having a crank wheel and a pinion engaging the said rack, substantially as described.

OLE E. O. HOELL.
OLE C. LAND,
HAKON THOMPSON,
*Executors of the estate of Andreas Syversen.*

In presence of—
M. J. FROST,
W. N. WILLIAMS.